(12) United States Patent
Nozawa

(10) Patent No.: US 8,186,218 B2
(45) Date of Patent: May 29, 2012

(54) PHYSICAL QUANTITY MEASURING APPARATUS AND ELECTRONIC DEVICE

(75) Inventor: Toshiyuki Nozawa, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 574 days.

(21) Appl. No.: 12/395,359

(22) Filed: Feb. 27, 2009

(65) Prior Publication Data

US 2009/0217757 A1 Sep. 3, 2009

(30) Foreign Application Priority Data

Feb. 29, 2008 (JP) ................................. 2008-049286
Dec. 2, 2008 (JP) ................................. 2008-307619

(51) Int. Cl.
*G01P 9/04* (2006.01)
*G01C 19/56* (2006.01)

(52) U.S. Cl. .................. 73/504.12; 73/504.16

(58) Field of Classification Search ............... 73/504.12, 73/504.04, 504.02, 504.14, 504.15, 504.16
See application file for complete search history.

(56) References Cited

U.S. PATENT DOCUMENTS

| | | | | |
|---|---|---|---|---|
| 6,508,122 | B1 * | 1/2003 | McCall et al. ............. | 73/504.12 |
| 6,588,274 | B1 * | 7/2003 | Kumada et al. ............ | 73/504.02 |
| 7,216,538 | B2 * | 5/2007 | Ito et al. .................... | 73/504.12 |
| 7,258,009 | B2 * | 8/2007 | Imai ........................... | 73/504.12 |
| 7,779,688 | B2 * | 8/2010 | Sato et al. .................. | 73/504.12 |
| 7,845,227 | B2 * | 12/2010 | Fukuzawa ................... | 73/504.12 |
| 7,870,786 | B2 * | 1/2011 | Fukuzawa ................... | 73/504.12 |
| 2002/0020219 | A1 * | 2/2002 | DeRoo et al. .............. | 73/504.12 |
| 2003/0041667 | A1 * | 3/2003 | White ........................ | 73/504.12 |
| 2006/0226741 | A1 * | 10/2006 | Ogura et al. ................. | 310/366 |
| 2009/0133496 | A1 * | 5/2009 | Kanai et al. ............... | 73/504.12 |

FOREIGN PATENT DOCUMENTS

| | | |
|---|---|---|
| JP | 11-044540 A | 2/1999 |
| JP | 2002-174520 A | 6/2002 |
| JP | 2008-209182 A | 9/2008 |

* cited by examiner

*Primary Examiner* — Helen C. Kwok
(74) *Attorney, Agent, or Firm* — Kilpatrick Townsend & Stockton LLP

(57) ABSTRACT

A physical quantity measuring apparatus includes an oscillation drive circuit that forms an oscillation loop together with a physical quantity transducer and excites a drive oscillation of the physical quantity transducer, and a detection circuit that detects an analog detection signal outputted from the physical quantity transducer using a detection circuit first and then converts the signal that has been detected into a digital signal using an A/D converter to output the digital signal. The oscillation drive circuit has a drive amplitude detection circuit that detects amplitude of the drive oscillation. A voltage level of a reference of the A/D converter included in the detection circuit is controlled on the basis of a detection output signal of the drive amplitude detection circuit.

15 Claims, 11 Drawing Sheets

PHYSICAL QUANTITY MEASURING APPARATUS AND ELECTRONIC DEVICE

BACKGROUND

1. Technical Field

The present invention relates to a physical quantity measuring apparatus (for example, an oscillatory gyroscope that detects an angular velocity by detecting a Coriolis force with respect to the oscillation motion of an oscillator), and an electronic device.

2. Related Art

An example of the configuration of the oscillatory gyroscope is described, for example, in JP-A-2002-174520. According to this reference, an AGC circuit (Automatic Gain Control circuit) configured to maintain the amplitude of the drive oscillations constant is provided in an oscillation drive circuit that excites drive oscillations of the oscillator.

The oscillatory gyroscope (hereinafter, referred to also as the gyroscope) of the cited reference is configured to maintain the drive amplitude constant by the AGC circuit as described above. However, in a state where the amplitude has not been maintained constant by the AGC circuit, the detection sensitivity is non-constant. At the start of oscillation, in particular, the sensitivity varies gradually because the amplitude increases gradually. Such being the case, the gyroscope in the related art has no choice but to render detection signals obtained in the oscillation start period invalid, which extends a start-up time until the desired detection sensitivity is achieved.

In addition, the amplitude of the drive oscillation varies with various disturbances (for example, a fluctuation of the power supply voltage or an impact given to the gyroscope from the outside). Accordingly, even when the AGC circuit is provided, the amplitude of the drive oscillation is kept disturbed over a period until the amplitude that was varied by a disturbance converges to a desired level. The detection sensitivity therefore varies in this period.

For example, in a case where the gyroscope is used to correct camera shaking, the amplitude of the drive oscillation varies with a slightest impact given to the camera. Hence, in order to achieve a gyroscope at a higher degree of accuracy, it is necessary to take a countermeasure against the cause of a mechanical disturbance (impacts and shaking given to an electronic device), not to mention a countermeasure against the cause of an electrical disturbance, such as a fluctuation of the power supply voltage. The problems discussed above, however, cannot be solved by the related art.

SUMMARY

An advantage of some aspects of the invention is that it is possible to maintain the detection sensitivity to a physical quantity to be detected constant, for example, even when the amplitude of the drive oscillation varies, which enables detection at a high degree of accuracy.

A physical quantity measuring apparatus according to a first aspect of the invention includes an oscillation drive circuit that forms an oscillation loop together with a physical quantity transducer and excites a drive oscillation of the physical quantity transducer, and a detection circuit that detects an analog detection signal outputted from the physical quantity transducer using a detection circuit first and thence converts the signal that has been detected into a digital signal using an A/D converter to output the digital signal. The oscillation drive circuit has a drive amplitude detection circuit that detects amplitude of the drive oscillation. A voltage level of a reference (reference voltage) of the A/D converter included in the detection circuit is controlled on the basis of a detection output signal of the drive amplitude detection circuit.

For example, in a case where an angular velocity is detected using the physical quantity measuring apparatus, a Coriolis force F applied to an oscillator serving as the physical quantity transducer in association with rotations is expressed as: $F = 2mv\Omega$, where $m$ is a mass of the oscillator, $v$ is the velocity of the oscillator, and $\Omega$ is the angular velocity. When the amplitude of the drive oscillation of the oscillator varies, so does the velocity $v$, which gives rise to a variance in a Coriolis force F. To avoid such an inconvenience, in the first aspect, the voltage level of the reference of the A/D converter provided at the output stage of the detection circuit is controlled variably (adaptively) in response to the amplitude of the drive oscillation. Hence, when the drive amplitude varies, the reference of the A/D converter varies so as to follow the variance of the drive amplitude. Accordingly, the code outputted from the A/D converter (for example, in the case of a 256-step A/D converter, the output code is any one of the code 0 through the code 255) is maintained constant. The detection sensitivity to the physical quantity to be detected can be thus always maintained constant independently of a disturbance. In short, according to the first aspect, the ratiometricity with respect to the drive oscillation of the oscillator (a novel ratiometric configuration in which the detection sensitivity does not vary with a variance of the drive amplitude) can be achieved.

It is preferable that the voltage level of the reference of the A/D converter is controlled so that a variance width of the A/D converter is proportional to the amplitude of the drive oscillation.

For example, assume that two references, VrefH and VrefL, are used as the reference of the A/D converter. Then, the dynamic range defined by the references VrefH and VrefL is the variance width of the A/D converter. Also, given a detection output of the detection circuit in a state before the drive amplitude varies as Vdetect1 and a detection output in a state after the drive amplitude varies as Vdetect2. Herein, according to this configuration, a ratio of (Vdetect1-VrefL) with respect to (VrefH-Vdetect1) and a ratio of (Vdetect2-VrefL) with respect to (VrefH-Vdetect2) are the same. Accordingly, the code outputted from the A/D converter remains the same even when the drive amplitude varies. The detection sensitivity to the physical quantity can be thus maintained constant.

It is preferable that the oscillation drive circuit has an AGC circuit to maintain the amplitude of the drive oscillation constant and the drive amplitude detection circuit is one of circuits that form the AGC circuit.

In a case where the AGC circuit is incorporated in the oscillation drive circuit, the AGC circuit is inevitably provided with the drive amplitude detection circuit to detect the amplitude of the drive oscillation (the oscillation amplitude of the oscillation loop). The need to provide a new drive amplitude detection circuit can be eliminated by using the detection signal of the drive amplitude detection circuit also to control the reference of the A/D converter. Hence, the area occupied by the circuit will not be increased.

It is preferable that at least one of the detection output signal of the drive amplitude detection circuit and a signal obtained by inverting a voltage level of the detection output signal is used as the reference of the A/D converter.

It is possible to use the detection output signal of the drive amplitude detection circuit (or a signal obtained by inverting the voltage level thereof) intact as the reference of the A/D converter. In a case where there are two references (VrefH and VrefL) of the A/D converter and each of the two references is varied adaptively, it is possible to use both the detection output signal of the drive amplitude detection circuit and a signal obtained by inverting the voltage level thereof as the references VrefH and VrefL. In a case where either one of the two references (VrefH or VrefL) of the A/D converter is varied adaptively, either the detection output signal of the drive amplitude detection circuit or a signal obtained by inverting the voltage level thereof can be used as the reference VrefH or VrefL.

It is preferable that given a signal obtained by adjusting a voltage level of the detection output signal of the drive amplitude detection circuit as a first signal and a signal obtained by inverting a voltage level of the first signal as a second signal, then at least one of the first signal and the second signal is used as the reference of the A/D converter.

In order to achieve the ratiometricity with respect to the drive oscillation, it becomes necessary to adjust the voltage level of the detection output signal in some cases. It is possible to adjust (raise or lower) the voltage level by amplifying the detection signal of the drive amplification detection circuit using, for example, an amplifier having a predetermined gain (or a variable gain amplifier).

It is preferable that the detection circuit has an offset adjusting circuit that compensates for an offset voltage superimposed on the detection output signal of the drive amplitude detection circuit.

When an offset voltage (generated by various causes, such as a variance in characteristics of amplifiers and transistors) is superimposed on the reference bias AGND (analog ground, for example, AGND=VDD/2) in a signal channel of the oscillation drive circuit (and the detection circuit), the offset voltage causes an error in achieving the ratiometricity with respect to the drive oscillation of the oscillator. In order to eliminate such an inconvenience, the offset voltage is compensated for by providing the offset adjusting circuit. Accordingly, even when an offset is superimposed on the detection output of the drive amplitude detection circuit, the detection sensitivity does not vary.

It is preferable that the drive amplitude detection circuit has a rectifying circuit that rectifies an oscillation signal of the oscillation loop, and a smoothing circuit that smoothes out an output signal of the rectifying circuit.

According to this configuration, it is possible to generate a voltage signal corresponding to the amplitude of the drive oscillation.

It is preferable that the drive amplitude detection circuit is formed of a rectifying and integrating circuit formed by integrating a rectifying circuit that rectifies an oscillation signal of the oscillation loop and an integrating circuit that integrates a rectified signal into one piece.

According to this configuration, the circuit configuration of the drive amplitude detection circuit can be simplified. The area occupied by the circuit can be thus reduced.

It is preferable that the oscillation drive circuit has an amplitude limiting circuit that is provided instead of an AGC circuit to maintain the amplitude of the drive oscillation constant in order to limit at least one of an upper limit and a lower limit of the amplitude of the drive oscillation.

As has been described, in the physical quantity measuring apparatus according to the aspect of the invention configured as above, even when the drive amplitude varies, the reference of the A/D converter also varies so as to follow the variance of the drive amplitude. The detection sensitivity to a physical quantity can be thus maintained constant independently of a disturbance. Hence, the physical quantity measuring apparatus adopts a simple circuit configuration in which the amplitude limiting circuit (amplitude limiter) is provided in the oscillation drive circuit instead of the AGC circuit (that is, a circuit configuration that merely suppresses the maximum value of the variance width of the amplitude of the drive oscillation to be equal or below the predetermined level). Accordingly, not only can the area occupied by the oscillation drive circuit be reduced, but also the power consumption can be reduced.

An electronic device according to a second aspect of the invention includes the physical quantity measuring apparatus configured as above and a movable mechanism that operates concurrently with the physical quantity measuring apparatus.

The physical quantity measuring apparatus according to the aspect of the invention is able to maintain the detection sensitivity to a physical quantity constant independently of a disturbance. Accordingly, it is possible to obtain an effective detection signal of the physical quantity even in the oscillation start period (a period since the power is turned on until an oscillation stationary state is achieved). A waiting time at the start-up of an electronic device can be thus shortened. In addition, not only the countermeasure against the cause of an electrical disturbance, such as a fluctuation of the power supply voltage, but also the countermeasure against the cause of a mechanical disturbance (impacts and shaking given to the electronic device) can be achieved. Further, in a case where the electronic device has a movable mechanism that operates concurrently with the physical quantity measuring apparatus according to the aspect of the invention, influences of oscillations and impacts from the movable mechanism can be eliminated. The performance of the electronic device can be thus enhanced.

As has been described, according to some aspects of the invention, it is possible to maintain the detection sensitivity to a physical quantity to be detected constant, for example, even when the amplitude of the drive oscillation varies. Detection at a high degree of accuracy can be thus enabled.

It is preferable that any of the physical quantity measuring apparatus configured as above is an oscillatory gyroscope, and the physical quantity transducer is an oscillatory gyroscope element in which the drive oscillation is excited by the oscillation drive circuit and that generates a detection signal having amplitude corresponding to an angular velocity.

Accordingly, it is possible to achieve an oscillatory gyroscope that takes not only the countermeasure against the cause of an electric disturbance, such as a fluctuation of the power supply voltage, but also the countermeasure against the cause of a mechanical disturbance (impacts and shaking given to the electronic device) and is thereby capable of performing measurement at a high degree of accuracy.

An electronic device according to a third aspect of the invention includes any of the physical quantity measuring apparatus configured as above and a movable mechanism. An operation period of the physical quantity measuring apparatus overlaps an operation period of the movable mechanism.

Even in a case where the operation period of the movable mechanism included in the electronic device overlaps the operation period of the physical quantity measuring apparatus, there will occur no inconvenience, such as deterioration of the measurement accuracy of the physical quantity measuring apparatus due to influences of oscillations and impacts from the movable mechanism. The performance of the electronic device can be thus enhanced.

It is preferable that the movable mechanism includes a mechanical movable component.

Examples of the movable mechanism including a mechanical movable element include but not limited to a mechanical shutter provided to a camera, a mirror flip-up mechanism (or a quick return mechanism) or an AF (autofocus) control mechanism provided to a single-lens reflex camera, and a vibrator provided to a home-use game controller.

It is preferable that the movable mechanism is an impact source that generates an impact.

For example, because the mechanical shutter provided to a camera is opened and closed instantaneously, a mechanical impact is generated in association with the opening and closing operation. In addition, because the mirror flip-up mechanism (or the quick return mechanism) provided, for example, to a single-lens reflex camera is operated so that the mirror evacuates from the optical axis or returns to the original position instantaneously, a mechanical impact is generated in association with such an operation. Further, the AF control mechanism provided, for example, to a single-lens reflex camera may possibly generate a mechanical impact when the AF motor is driven or stopped driving. The movable mechanism can therefore be an impact source.

In the case of a camera (including a single-lens reflex camera) in which the gyroscope according to one aspect of the invention is provided in order to correct camera shaking, the gyroscope is always able to measure an angular velocity at a high degree of accuracy without being affected by the mechanical impact generated by operations of the movable mechanism. The camera shaking can be thus corrected precisely.

It is preferable that the movable mechanism is an oscillation source that generates an oscillation.

For example, there is a case where a vibrator is incorporated in a home-use game controller for enabling the user to enjoy a game with a realistic feeling. The vibrator is a mechanical oscillation source. For example, in a case where the gyroscope according to the aspect of the invention is provided inside a game controller in order to detect the posture of the game controller, the gyroscope is always able to measure an angular velocity at a high degree of accuracy without being affected by a mechanical oscillation generated by operations of the movable mechanism. The posture can be thus detected precisely.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will now be described with reference to the drawings. It should be appreciated that embodiments described below are not intended to unduly limit the contents of the invention described in the appended claims and not all the configurations described in the embodiments below are essential in the invention as means for solving the problems.

First Embodiment

Firstly, the operation principle of the oscillatory gyroscope will be described. The oscillatory gyroscope is an angular velocity measuring apparatus using a piezoelectric oscillator made of crystal or ceramic or an electrostatic-driven oscillator made of silicon (physical quantity transducer). When an angular velocity is given to an oscillator in oscillation motion (drive oscillation), a Coriolis force acts in a direction orthogonal to the direction of oscillation and the oscillator consequently starts to oscillate in the direction of a Coriolis force (starts detection oscillation). The oscillation induced by a Coriolis force is at the same frequency as the drive oscillation and the amplitude thereof is proportional to the angular velocity that was inputted. It is therefore possible to measure the angular velocity applied on the oscillator by measuring the strength of the oscillation (detection oscillation) induced by a Coriolis force.

Figure 11:
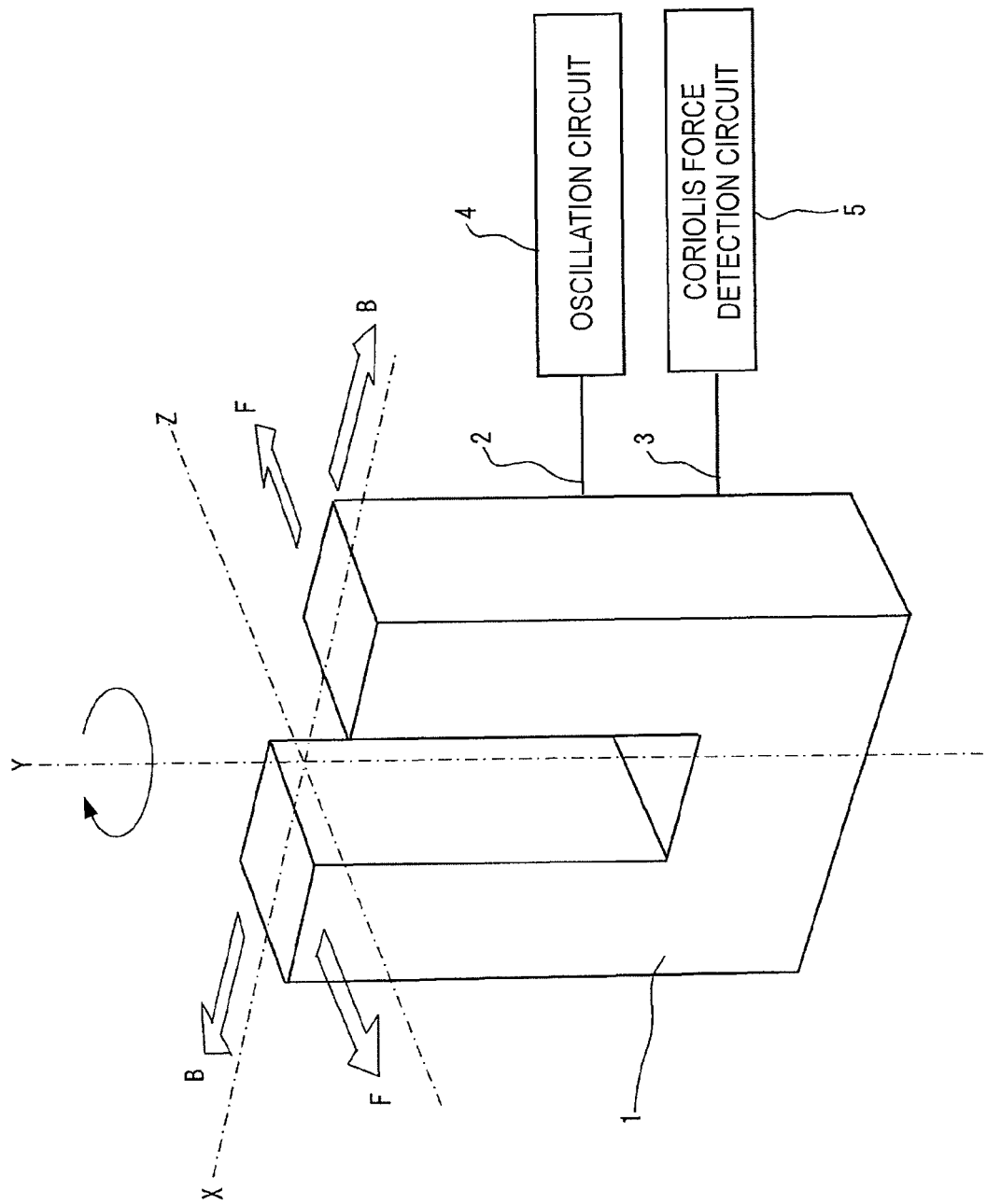
FIG. 11 is a view used to describe the operation principle of the oscillatory gyroscope.

FIG. 11 is a view used to describe the operation principle of the oscillatory gyroscope. In a case where a tuning-fork crystal oscillator is used as an oscillator 1 of the oscillatory gyroscope, a drive electrode 2 for excitation and a detection electrode 3 for detection of a Coriolis force are provided to predetermined points on the surface of the oscillator 1. An oscillation circuit 4 to supply an AC (Alternating Current) drive voltage is connected to the drive electrode 2. Also, a detection circuit 5 is connected to the detection electrode 3.

The oscillator 1 has a mass m and when an AC drive voltage is applied to the drive electrode 2 from the oscillation circuit 4, the oscillator 1 oscillates at a predetermined frequency in a direction B along the X axis. When an angular velocity $\Omega$ is applied about the Y axis, a Coriolis force F ($=2$ mv$\Omega$) develops in the Z axis direction orthogonal to the X axis. Herein, v is a velocity of the piezoelectric oscillator 1. Because a Coriolis force F is determined in proportion to the magnitude of the angular velocity $\Omega$, it is possible to find the magnitude of the angular velocity $\Omega$ of the piezoelectric oscillator 1 by detecting a Coriolis force F as an amount of deflection displacement of the piezoelectric oscillator 1 using the detection electrode 3 and the detection circuit 5.

Herein, the velocity v of the oscillator driven by the oscillation circuit is expressed as: v=a sin $\omega_0$t, where a is the amplitude of drive oscillation, $\omega_0$ is the angular frequency of the drive oscillation, and t is the time. It is understood from the expression that in order to maintain a Coriolis force with respect to a constant angular velocity input Q and hence a detection signal constant, it is necessary to maintain the amplitude a of the drive oscillation constant (the detection sensitivity rises as the amplitude becomes larger and the detection sensitivity drops as the amplitude becomes smaller). In addition, it is understood that the detection output is outputted in the form of a so-called AM (Amplitude-Modulated wave) at the same frequency as the drive oscillation and having the amplitude proportional to the angular velocity input Ω.

Accordingly, in the drive and detection circuit in a typical oscillatory gyroscope, the oscillation circuit 4 adopts a configuration in which the amplitude a of the drive oscillation is maintained constant by including an AGC (Automatic Gain Control) circuit to maintain the oscillation amplitude constant.

Example of Circuit Configuration of Oscillatory Gyroscope

Figure 1:
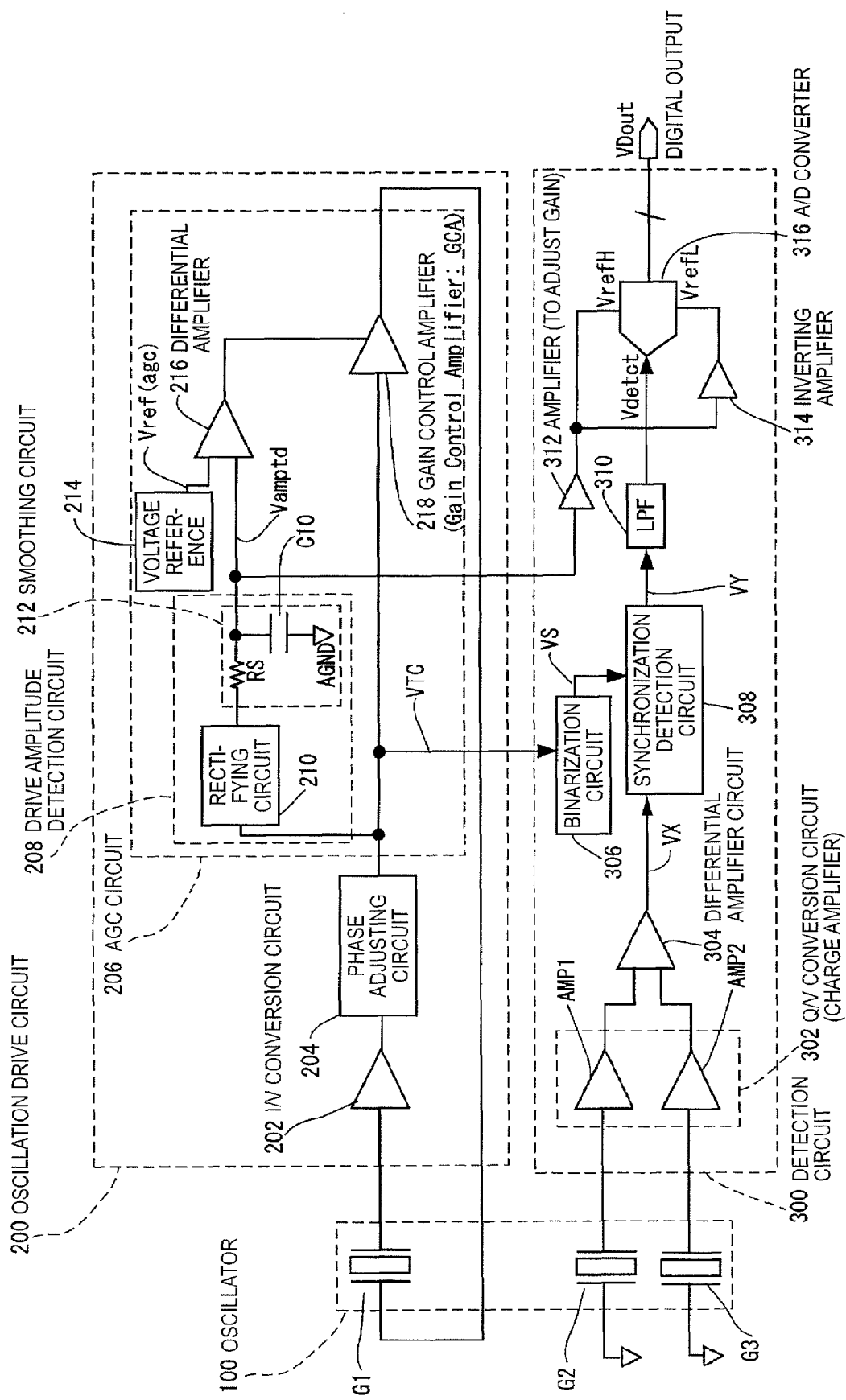
FIG. 1 is a view showing an example of the basic configuration of an oscillatory gyroscope.

FIG. 1 is a view showing an example of the basic configuration of the oscillatory gyroscope. In the case of the oscillatory gyroscope (hereinafter, referred to also as the gyroscope or simply to as the sensor) of FIG. 1, an A/D converter 316 is provided at the output stage of a detection circuit 300 of the gyroscope (sensor) so as to obtain a digital output. Further, the voltage level of the reference (VrefH and VrefL) of the A/D converter 316 is controlled variably (adaptively) on the basis of an output signal (Vamptd) of a drive amplitude detection circuit 208 included in an AGC circuit 206 on the side of an oscillation drive circuit 200. Owing to this configuration, the ratiometricity with respect to the drive oscillation of the oscillator (that is, a novel ratiometric configuration in which the detection sensitivity does not vary with a variance of the drive amplitude) is achieved. The constant sensitivity can be thus always maintained independently of the drive amplitude.

Overall Configuration

As is shown in FIG. 1, the oscillation drive circuit 200 has an I/V conversion circuit 202, a phase adjusting circuit 204, and an AGC circuit 206. The oscillation drive circuit 200 forms an oscillation loop together with an oscillator 100, which is a physical quantity transducer, and excites the drive oscillation of the oscillator 100. The AGC circuit 206 has a drive amplitude detection circuit 208 (including a rectifying circuit 210 and a smoothing circuit 212), a voltage reference circuit 214, a differential amplifier 216, and a GCA (Gain Control Amplifier) 218. The smoothing circuit 212 includes a resistor RS and a capacitor C10. The smoothing circuit 212 outputs a signal (that is, a detection output signal of the drive amplitude detection circuit 208) Vamptd at a voltage level corresponding to the amplitude of the drive signal of the oscillation loop (that is, the drive oscillation of the oscillator). The differential amplifier 216 amplifies a difference between the signal Vamptd and the reference Vref(agc), and the resulting amplified signal becomes a gain control signal of the GCA 218. In an oscillation stationary state, the GCA 218 controls the oscillation amplitude so that the oscillation amplitude will be the amplitude defined by the reference Vref(agc).

In addition, a detection circuit 300 of the oscillatory gyroscope has a Q/V conversion circuit (charge amplifier) 302 including an AMP1 and an AMP2, a differential amplifier circuit (differential amplifier) 304, a binarization circuit 306, a synchronization detection circuit 308, an LPF (Low-Pass Filter) 310, a gain adjusting amplifier 312, an inverting amplifier 314, and an A/D converter 316. The binarization circuit 306 applies a binarization process, for example, to a signal VTC within the oscillation loop, which is a sine wave, and supplies a synchronization signal (reference signal) VS obtained by the binarization process to the synchronization detection circuit 308. The binarization circuit 306 can be achieved, for example, by a comparator. Herein, VX is an input signal and VY is an output signal of the synchronization detection circuit 308. A detection output (direct current voltage) Vdetect is obtained by smoothing out the output signal VY of the synchronization circuit 308 through the LPF 310. The A/D converter 316 converts the detection output (direct current voltage) Vdetect into a digital code and outputs the digital code as a digital output (VDout). Herein, the oscillator (oscillatory gyroscope element) 100 serving as a physical quantity transducer is, for example, a crystal oscillator, and for example, of the tuning-fork configuration as shown in FIG. 11. FIG. 1 shows the equivalent circuit (that is, the circuit configuration having three electrical oscillators G1 through G3) of the oscillator 100.

The voltage level of the reference (VrefH and VrefL) of the A/D converter 316 is controlled variably (adaptively) on the basis of an output signal (Vamptd) of the drive amplitude detection circuit 208 included in the AGC circuit 206 on the side of the oscillation drive circuit 200. In the case of FIG. 1, an output signal of the gain adjusting amplifier 312 is used as the reference VrefH and a signal obtained by inverting the voltage level of an output signal of the gain adjusting amplifier 312 by the inverting amplifier 314 is used as the reference VrefL. It is possible to adopt another configuration in which one of the references VrefH and VrefL is given as a fixed value and only the other is varied adaptively. Further, there is a case where an output signal (Vamptd) of the drive amplitude detection circuit 208 can be used intact as the reference (VrefH and VrefL) of the A/D converter 316. In this case, the gain adjusting amplifier 312 can be omitted.

Configuration and Operation of Oscillation Drive Circuit 200

The oscillation drive circuit (hereinafter, referred to also simply as the drive circuit) 200 is an oscillation circuit using the oscillator (oscillatory gyroscope element) 100 as a resonator. A current signal outputted from the oscillator 100 is converted to a voltage in the I/V conversion circuit (current/voltage conversion circuit) 202. The phase adjusting circuit 204 is a circuit that adjusts the phase for the oscillation circuit to maintain an oscillation state. The phase adjusting circuit 204 can be omitted in a case where it is possible to maintain a stable oscillation state in its absence. The phase of a signal outputted from the I/V conversion circuit 202 is adjusted in the phase adjusting circuit 204 and then the signal is amplified by the GCA 218, after which the signal is fed back to the oscillator 100, thereby forming the oscillation loop. The oscillation loop is provided with the AGC circuit 206 that maintains the oscillation amplitude constant. The AGC circuit 206 is formed of the drive amplitude detection circuit 208 that detects the drive amplitude, the voltage reference circuit 214 that provides the reference of the amplitude, and the differential amplifier 216 that amplifies a difference between the amplitude signal (Vamptd) outputted from the drive amplitude detection circuit 208 and the reference (Vref(agc)) in addition to the GCA 218 described above. When the detected drive amplitude is larger than the reference, the AGC circuit 206 operates so as to reduce the drive amplitude by lowering the gain of the GCA 218. On the contrary, when the detected drive amplitude is smaller than the reference, the AGC circuit 206 operates so as to increase the amplitude by raising the gain of the GCA 218. The AGC circuit 206 thus operates so as to maintain the constant drive amplitude.

FIG. 2A through FIG. 2D are circuit diagrams used to describe concrete examples of major circuits forming the oscillation drive circuit.

Figure 2A:
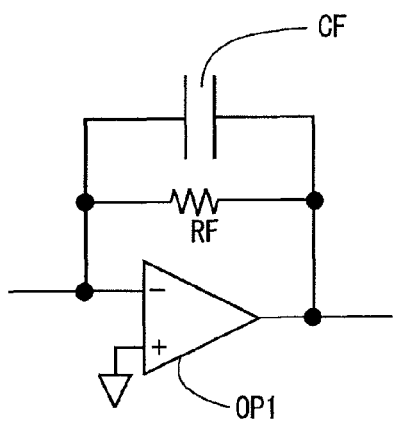
FIGS. 2A through FIG. 2D are circuit diagrams used to describe concrete examples of major circuits forming an oscillation drive circuit.

FIG. 2A shows an example of the configuration of the I/V conversion circuit 202. The I/V conversion circuit 202 is used in a region where a signal frequency fsig becomes lower than a cutoff frequency that is determined by a feedback resistor RF and a feedback capacity CF (fsig<½ πRFCF). Herein, CF is a capacity to prevent oscillation and can be omitted in a case where the circuit is stable.

Figure 2B:
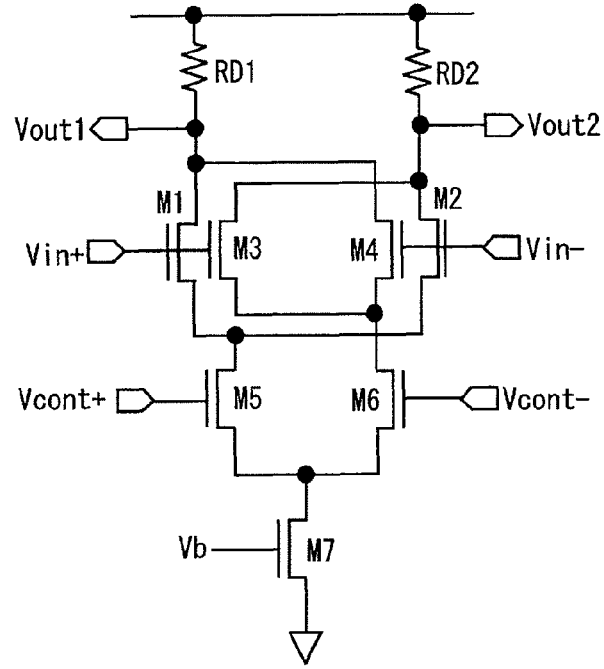
Figure 2C:
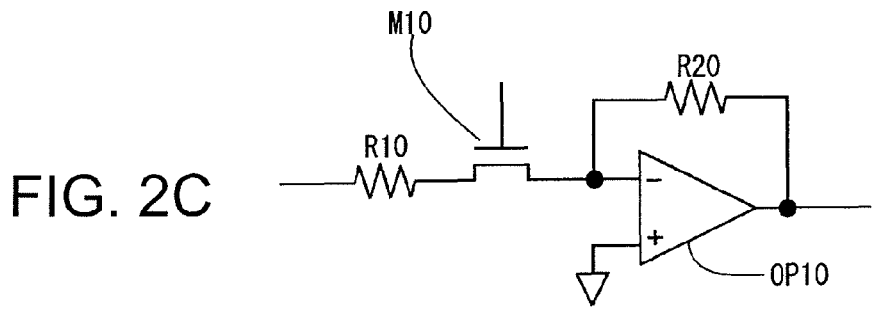

FIG. 2B shows an example of the circuit of the GCA 218 (a Gilbert cell, which is a typical analog multiplication circuit). More specifically, the GCA 218 is formed of MOS transistors M1 through M7 and resistors RD1 and RD2. FIG. 2B shows the Gilbert cell alone. It should be appreciated, however, that an amplifier that adjusts a gain may be additionally connected. FIG. 2C shows an example of the circuit of a GCA of a type that controls a gain using a MOS transistor M10 as a variable resistor. The circuit of FIG. 2C is formed of a resistor R10, the MOS transistor M10, an operational amplifier OP10, and a feedback resistor R20.

Figure 2D:
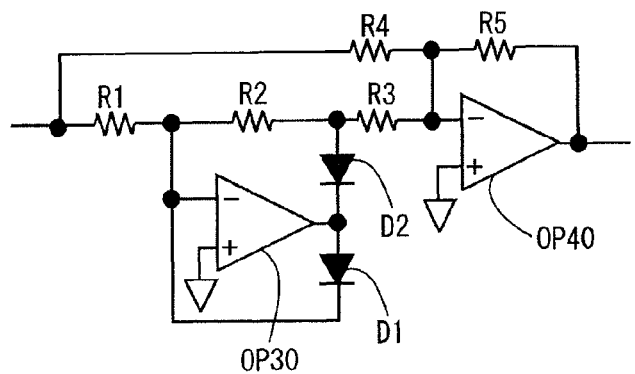

The drive amplitude detection circuit 208 is a circuit that outputs a (direct current) voltage Vamptd corresponding to the drive amplitude, and is formed, for example, of a rectifying circuit and a smoothing circuit. An example of the configuration of the rectifying circuit is shown in FIG. 2D. The circuit of FIG. 2D is formed of resistors R1 through R5, operational amplifiers OP30 and OP40, and diodes D1 and D2. The drawing shows a full-wave rectifying circuit (absolute value circuit). It should be appreciated, however, that there is no trouble when a half-wave rectifying circuit is used (this replacement merely causes a variance of a gain from the drive amplitude to an output voltage Vamptd of the drive amplitude detection circuit).

The AGC capability can be achieved by controlling a gain of the GCA 218 by amplifying a difference between the voltage Vamptd corresponding to the drive amplitude and the reference Vref(agc). When the voltage Vamptd is larger than the reference, the gain of the GCA 218 is controlled to drop. On the contrary, when the voltage Vamptd is smaller than the reference, the gain of the GCA 218 is controlled to rise. In this manner, the drive amplitude is controlled to remain constant.

Figure 3A:
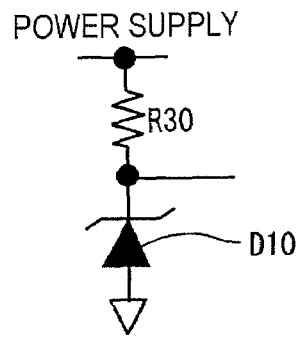
FIG. 3A through FIG. 3D are views used to describe examples of the configuration of a voltage reference circuit and an operation of a synchronization detection circuit.
Figure 3B:
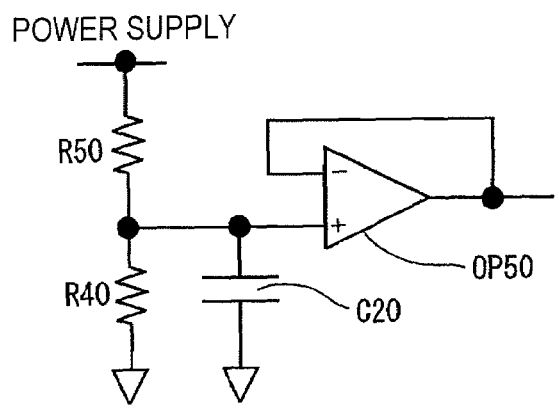
Figure 3C:
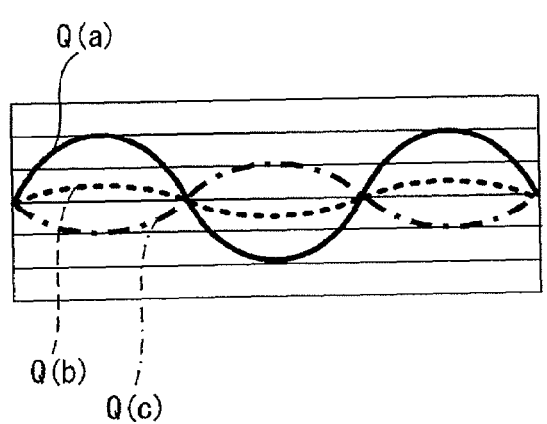

FIG. 3A through FIG. 3D are views used to describe examples of the configuration of the voltage reference circuit and an operation of the synchronization detection circuit. The voltage reference circuit 214 can be a constant voltage by a bandgap reference or a Zener diode (FIG. 3A) or it may be generated, for example, by a divided voltage from the power supply voltage (FIG. 3B). The case of FIG. 3B forms the ratiometric configuration in which the amplitude controlled by means of AGC varies with the power supply voltage. The circuit of FIG. 3A is formed of a Zener diode D10 and a resistor R30, and a voltage is extracted from a common connection point of the Zener diode D10 and the resistor R30. The circuit of FIG. 3B is formed of resistors R50 and R40 connected in series between a high level power supply and the ground potential, a capacity C20, and an operational amplifier OP50.

Configuration and Operation of Detection Circuit

Meanwhile, the detection circuit 300 is formed of a charge/voltage conversion circuit (charge amplifier) 302 that receives charges outputted from the oscillator 100 by deflection displacement caused by a Coriolis force and converts the charges to a voltage, a differential amplifier circuit 304, a synchronization detection circuit 308 that demodulates an amplitude-modulated signal, an LPF 310, and an ADC (A/D Converter) 316.

Figure 3D:
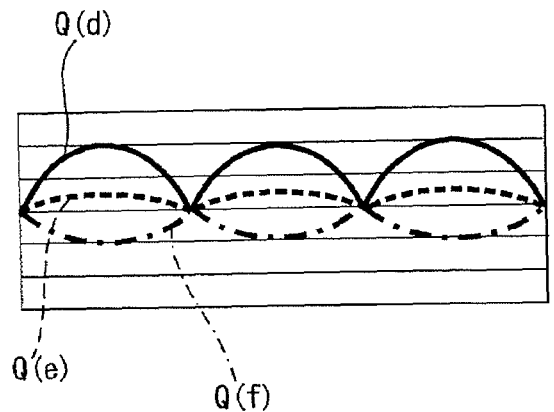

A signal received at the charge amplifier 302 is amplified by the differential amplifier circuit 304 and inputted into the synchronization detection circuit 308. At this point, the signal is an AM signal corresponding to the angular velocity input Ω (and the drive amplitude a) (see FIG. 3C). When demodulated in the synchronization detection circuit 308, the signal forms a waveform (a full-wave rectified waveform) as is shown in FIG. 3D. A voltage corresponding to the angular velocity input Ω is obtained by smoothing out the resulting waveform using the LPF 310. Further, a digital output corresponding to the angular velocity input Ω is obtained by converting an output voltage of the LPF 310 to a digital value by the A/D converter 316.

In this embodiment, the reference (VrefH or VrefL) of the A/D converter 316 is controlled adaptively on the basis of an output Vamptd of the drive amplitude detection circuit 208 in the AGC circuit 206. From another point of view, it can be said that the reference (VrefH or VrefL) is generated on the basis of an output Vamptd of the drive amplitude detection circuit 208 in the AGC circuit 206.

The output Vamptd of the drive amplitude detection circuit 208 is expressed as Vamptd=ka×a, where a is the drive amplitude and ka is a conversion coefficient of the drive amplitude detection circuit 208.

Further, given kr as the gain of the gain adjusting amplifier 312, then the reference of the A/D converter 316 is expressed as: VrefH=kr×Vamptd=kr×ka×a, and VrefL=−kr×Vamptd=−kr×ka×a. In short, the A/D converter 316 converts a signal within a range of 2×kr×ka×a to a digital value of a predetermined number of bits.

Meanwhile, a Coriolis force with respect to the angular velocity Ω is expressed as: F=2×m×a sin ω0t×Ω, and it is proportional to the drive amplitude a. Accordingly, the Vdetect of the LPF 310 in the detection circuit 300 can be expressed as: Vdetect=kd×a×Ω. The output Vdetect of the LPF 310 inputted into the A/D converter 316 is proportional to the drive amplitude a and the output Vdetect is converted from an analog form to a digital form in the A/D converter 316 at the reference (VrefH or VrefL) corresponding to the drive amplitude a. Hence, it is possible to eliminate a term dependent on the drive amplitude a from the data after A/D conversion.

Figure 4:
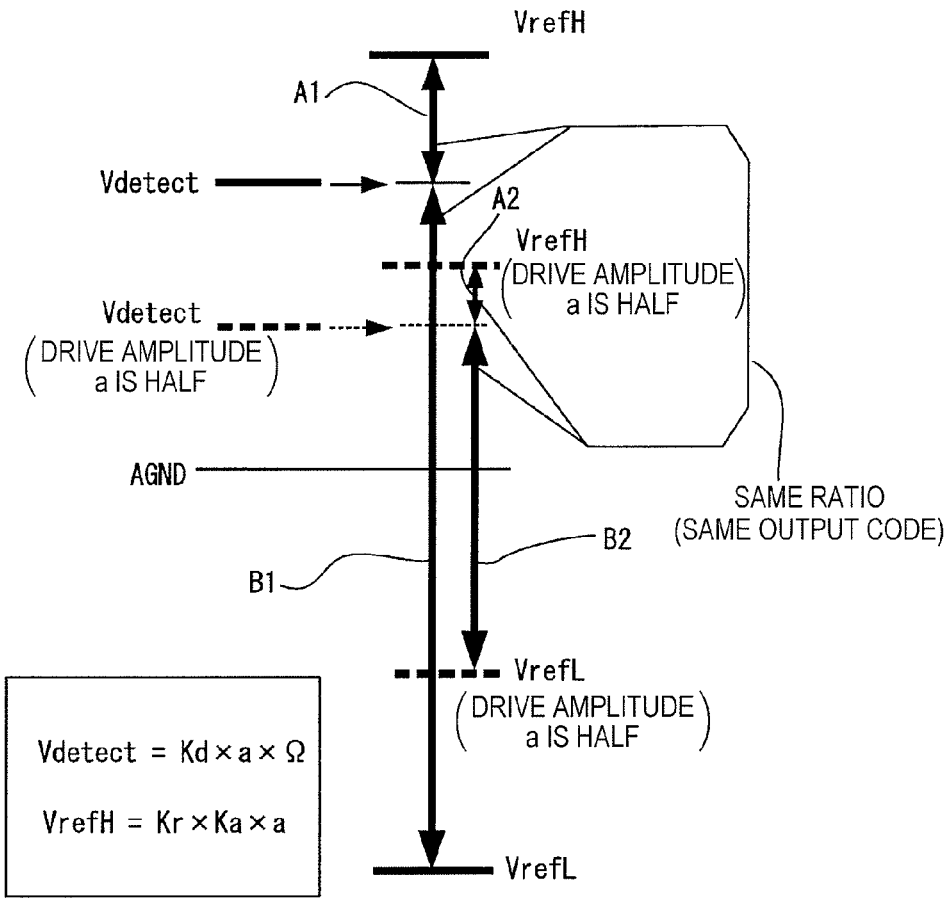
FIG. 4 is a conceptual view showing a manner in which A/D conversion is performed in a state where amplitudes of the drive oscillation are different.

FIG. 4 is a conceptual view showing a manner in which the A/D conversion is performed in a state where the amplitudes of the drive oscillation are different. Because the reference (VrefH or VrefL) of the A/D converter 316 is proportional to the drive amplitude a, a constant digital code is outputted in response to the angular velocity input Ω independently of the drive amplitude a. This will be described more concretely in the following.

Given a dynamic range defined by two references (VrefH and VrefL) as the conversion width of the A/D converter 316. Also, given Vdetect1 as the detection output in a state before the drive amplitude varies and Vdetect2 as a detection output in a state after the drive amplitude varies. Herein, as is shown in FIG. 4, a ratio of (Vdetect1-VrefL) with respect to (VrefH-Vdetect1) is A1:B1.

Meanwhile, a ratio of (Vdetect2-VrefL) with respect to (VrefH-Vdetect2) is A2:B2. As is shown in the drawing, A1:B1=A2:B2 and the value of the ratio does not vary before and after the amplitude varies. Accordingly, the digital code (in the case of 256 steps, any one of the code 0 through the code 255) outputted from the A/D converter 316 remains the same even when the drive amplitude varies. The detection sensitivity to a physical quantity is therefore maintained constant. Detection at a high degree of accuracy is thus enabled.

Figure 5:
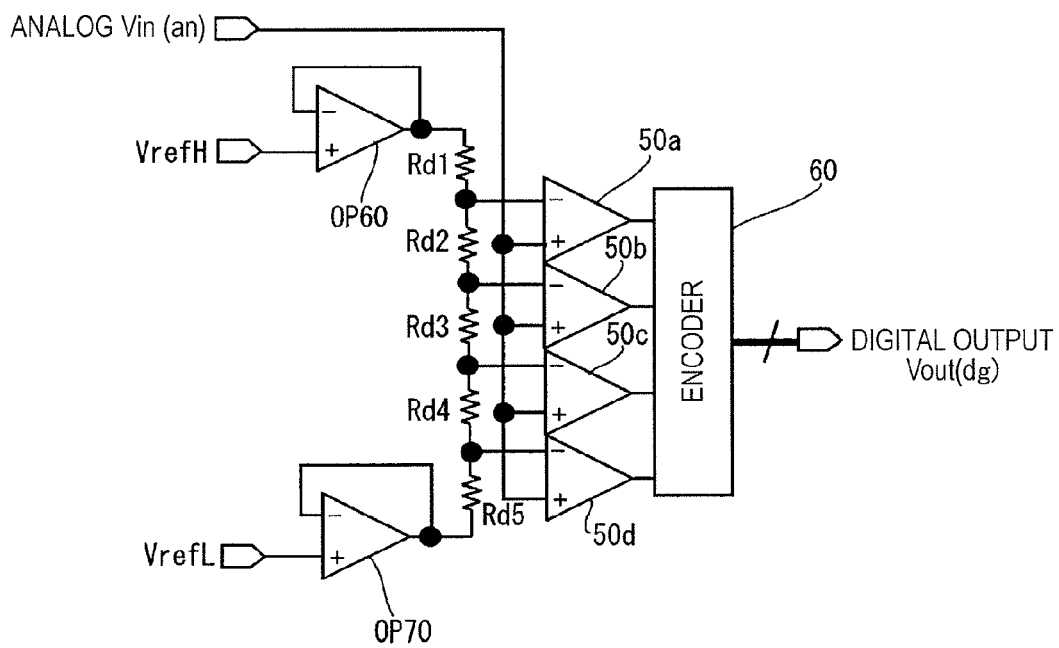
FIG. 5 is a view showing an example of a circuit (two bits) of a parallel A/D converter.

FIG. 5 is a view showing an example of a circuit (two bits) of a parallel A/D converter. Herein, Rd1 through Rd5 form a ladder resistor. Alpha-numerals 50a through 50d denote comparators and Numeral 60 denotes an encoder.

With the configurations described above, it is possible to form a gyroscope that maintains constant sensitivity independently of the drive amplitude even under the condition (at the time of start-up) where the drive amplitude is not maintained constant. Moreover, because the sensitivity is maintained constant using the reference of an ADC without using an analog multiplier, the gyroscope remains stable in response to changes of temperature and parameters of the transistors.

Figure 6:
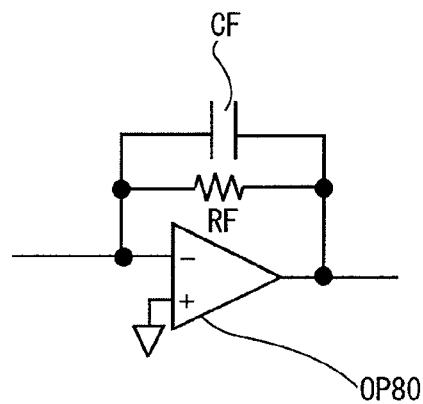
FIG. 6 is a view showing an example of a circuit of a charge amplifier.
Figure 7:
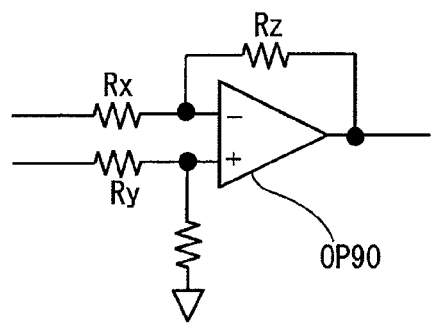
FIG. 7 is a view showing an example of the circuit configuration of a differential amplifier.

FIG. 6 is a view showing an example of a circuit of the charge amplifier. The charge amplifier 302 provided in the detection circuit 300 is used in a region where the signal frequency fsig is higher than a cutoff frequency that is determined by the feedback resistor RF and the feedback capacity CF. In short, $fsig > \frac{1}{2} \pi RFCF$ is set. Herein, RF is a feedback resistor of direct current components and uses a large resistance value. The circuit of FIG. 6 has an operational amplifier OP80, the feedback resistor RF, and the feedback capacity CF. FIG. 7 is a view showing one example of the circuit configuration of the differential amplifier. The operational amplifier circuit 304 can be formed using an operational amplifier OP90. Herein, Rx and Ry denote input resistors and Rz denotes a feedback resistor. Because these are typical circuits, descriptions of the operations of these circuits are omitted herein.

Figure 8:
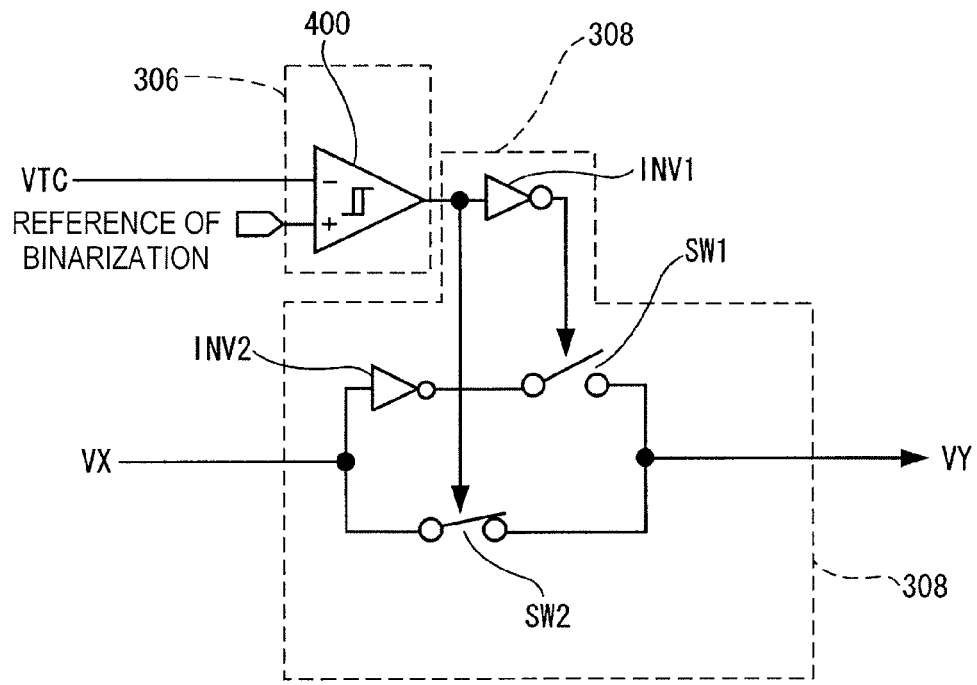
FIG. 8 is a view showing an example of the circuit configurations of a binarization circuit and a synchronization detection circuit.

FIG. 8 is a view showing examples of the circuit configurations of the binarization circuit and the synchronization detection circuit. FIG. 8 shows the synchronization detection circuit 308 using a switch mixer. It should be appreciated, however, that other configurations, such as a Gilbert mixer, may be used as well. Also, as the binarization circuit 306 in a case where a switch mixer is used, an inverter with the Schmitt trigger input may be used instead of a comparator 400 shown in FIG. 8. The synchronization detection circuit 308 of FIG. 8 has an inverting channel and a normal channel. The inverting channel is provided with an inverter (inverting amplifier) INV2 and a switch SW1 and the normal channel is provided with a switch SW2. The switch SW1 is driven to switch ON and OFF by an output signal of the binarization circuit 306. Also, the switch SW2 is driven to switch ON and OFF by an output signal of the inverter INV1.

It should be noted that the A/D converter 316 can adopt various circuit configurations, such as those of a parallel type, a successive-approximation type, a pipe line type, and a ΔΣ type.

Second Embodiment

Figure 9:
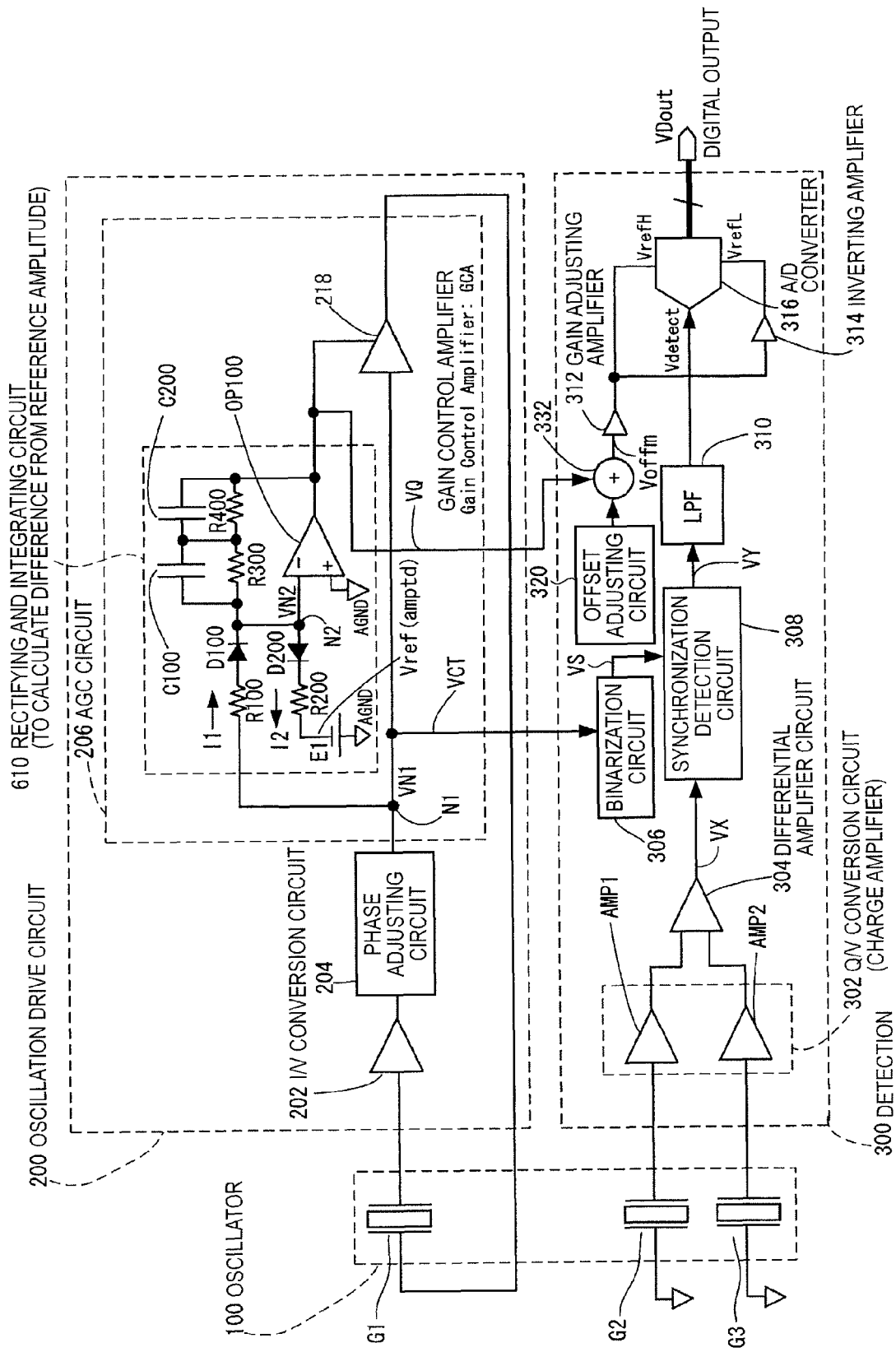
FIG. 9 is a view showing another example of the configuration of the oscillatory gyroscope of the invention.

FIG. 9 is a view showing another example of the configuration of the oscillatory gyroscope of the invention. The basic configuration in FIG. 9 is the same as in FIG. 1 and a difference is the circuit configuration in a portion of the AGC circuit 206 responsible for a rectifying operation and an integrating operation. Another difference from FIG. 1 is that an offset adjusting circuit 320 is provided to the detection circuit 300.

In contrast to the first embodiment above in which the reference of the A/D converter 316 is controlled with a voltage corresponding to the drive amplitude, in this embodiment, the reference of the A/D converter 316 is controlled with a voltage corresponding to the drive amplitude and a voltage obtained by amplifying a deviation from the reference that determines the drive amplitude. In other words, the drive amplitude detection circuit and the differential amplifier are not used as the control circuit of a GCA, and instead, a rectifying and integrating circuit formed by integrating a rectifying circuit and an integrating circuit into one piece is adopted.

A diode D100 forms a half-wave rectifying circuit. This circuit is a circuit that amplifies a deviation between a mean current I1 flowing through the D100 and a current I2 flowing through a D200 in an integrating circuit and outputs the result. Because the currents I1 and I2 are determined by resistors, the amplitude voltage and the reference are actually compared with each other (for example, see Hasshin Kairo no Sekkei to Ouyou (Design and Application of Oscillation Circuit), Tamotsu Inaba, CQ Publishing Co., Ltd.). This configuration can simplify the circuit configuration of the drive amplitude detection circuit (in the case of FIG. 9, an equivalent is a rectifying and integrating circuit 610). It is therefore possible to reduce an area occupied by the circuit.

Referring to FIG. 9, the reference of the A/D converter 316 in the detection circuit 300 is extracted from an output of the rectifying and integrating circuit 610 (that is, the control voltage of the GCA 218) (in the case of FIG. 1, the reference of the A/D converter 316 is extracted from an output of the drive amplitude detection circuit 208). The circuit of FIG. 9 subtracts a voltage corresponding to the reference Vref (amptd) of the amplitude control of the AGC circuit 206 from a voltage indicating the amplitude of the oscillation loop and controls the reference (VrefH or VrefL) of the A/D converter 316 to be proportional to the drive amplitude a on the basis of the voltage obtained by the subtraction.

Referring to FIG. 9, the rectifying and integrating circuit (a circuit that calculates a difference from the reference amplitude) 610 is formed of resistors R100 and R200, diodes D100 and D200, a voltage source E1 that generates the reference Vref (amptd), an operational amplifier OP100, feedback resistors R300 and R400, and feedback capacities (integral capacities) C100 and C200.

In FIG. 9, VN1 is given as the voltage at a node N1 and VN2 is given as the voltage at a node N2. The current I1 flows when VN1>VN2 and the current I2 flows when VN2 exceeds Vref (amptd). The operational amplifier OP100, the feedback resistors R300 and R400, and the feedback capacities (integral capacities) C100 and C200 together form the integrating circuit. The integrating circuit integrates a difference between the current I1 and the current I2 (a deviation between the currents I1 and I2) and generates a voltage corresponding to the difference. The voltage thus generated becomes a control voltage of the GCA 218. The control voltage of the GCA 218 is supplied to an adder 332 in the detection circuit 300.

By providing the offset adjusting circuit 320 in the detection circuit 300, even when the center voltage of the detection signal Vdetect and the center voltage of the reference of the A/D converter 316 are different, consistent processes are carried out by eliminating a DC offset. In FIG. 9, an offset compensating voltage generated in the offset adjusting circuit 320 is added to an output signal VQ of the rectifying and integrating circuit 610 by the adder 332. An offset-compensated signal Voffm corresponding to the drive amplitude is thus generated. The gain adjusting amplifier 312 adjusts the voltage level (amplitude) of the signal Voffm. The high-level reference (VrefH) of the A/D converter 316 is dynamically controlled with a signal whose voltage level has been adjusted.

Herein, a signal whose voltage level has been adjusted itself is used as the reference VrefH. It should be appreciated, however, that the invention is not particularly limited to this configuration. It may be configured in such a manner that a variable voltage reference circuit that generates the reference VrefH is provided separately, so that the output voltage level of the variable voltage reference circuit is controlled variably using a voltage signal corresponding to the amplitude of the drive oscillation as a control signal.

In FIG. 9, a signal obtained by inverting the voltage level of a signal whose voltage level has been adjusted in the inverting amplifier 314 is used as the low-level reference (VrefL). However, it may be configured in such a manner that a variable voltage reference circuit that generates the reference VrefL is provided separately, so that the output voltage level of the variable voltage reference circuit is controlled variably using a signal obtained by inverting a signal corresponding to the amplitude of the drive oscillation.

More specifically, when an offset voltage (generated by various causes, such as a variance in characteristics of amplifiers and transistors) is superimposed on a reference bias AGND (for example, AGND=VDD/2) of the signal channel in the oscillation drive circuit (and the detection circuit), the offset voltage causes an error in achieving the ratiometricity with respect to the drive oscillation of the oscillator. In order to avoid such an inconvenience, the offset voltage is compensated for by providing the offset adjusting circuit 320. Accordingly, even when an offset is superimposed on the detection output of the drive amplitude detection circuit (in the case of FIG. 9, an equivalent is the rectifying and integrating circuit 610), the detection sensitivity does not vary. The gyroscope of this embodiment is thus able to achieve the same advantages as the first embodiment above.

Third Embodiment

Figure 10:
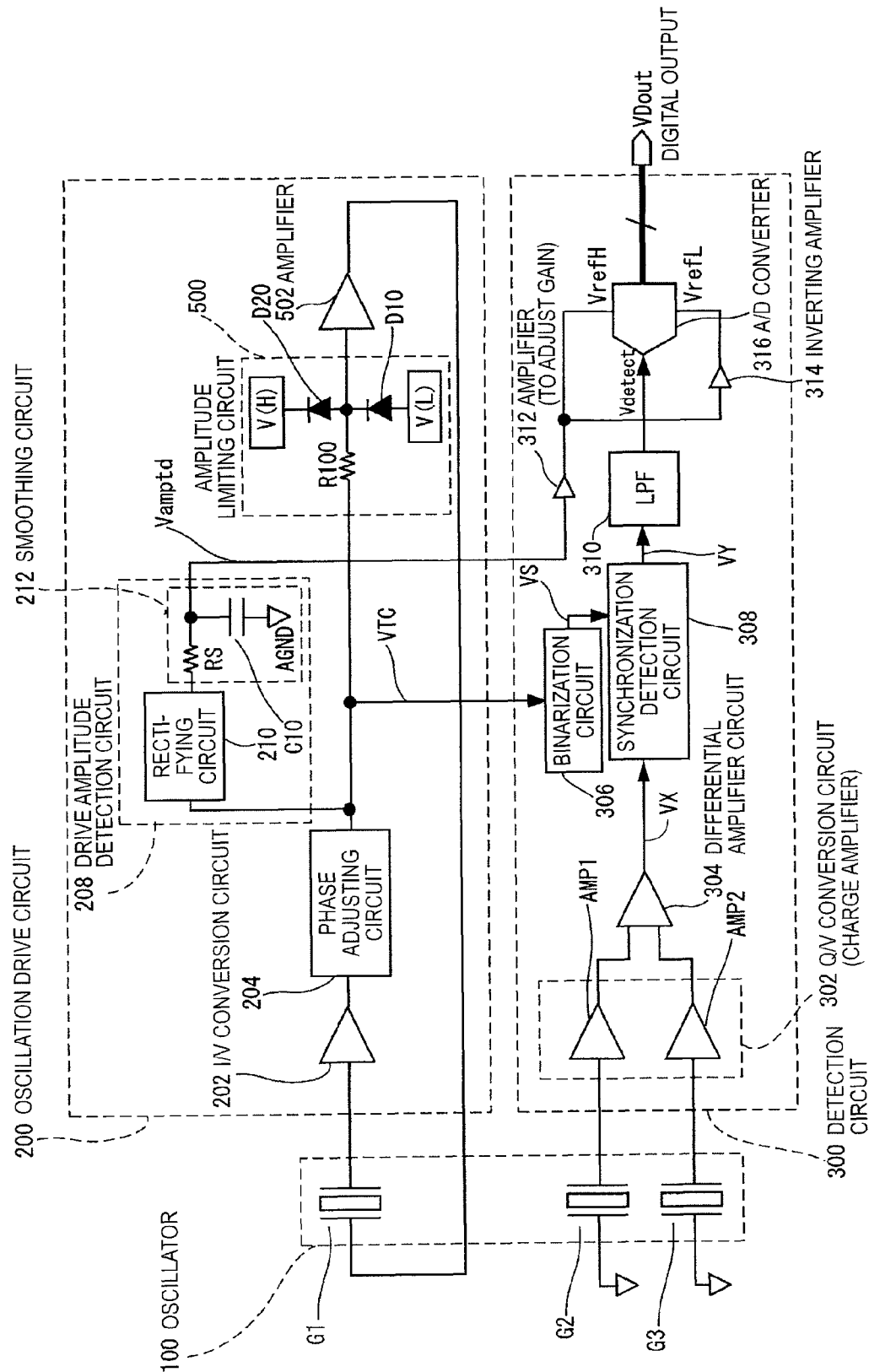
FIG. 10 is a view showing still another example of the configuration of the oscillatory gyroscope of the invention.

FIG. 10 is a view showing still another example of the configuration of the oscillatory gyroscope of the invention. The first embodiment above adopts the configuration in which the drive amplitude a is maintained constant by means of AGC. When the invention is used, however, an AGC circuit is no longer essential because the sensitivity to an angular velocity can be maintained constant independently of the drive amplitude a.

Accordingly, in this embodiment, a variance width of the drive amplitude in the oscillation drive circuit 200 is limited by an amplitude limiting circuit 500. In addition, the reference of the A/D converter 316 is controlled variably (adaptively) on the basis of the detection signal of the drive amplitude detection circuit 208. The amplitude limiting circuit 500 has a resistor R100 and diodes D10 and D20. A lower limit voltage V(L) is connected to the anode of the diode D10 and an upper limit voltage V(H) is connected to the cathode of the diode D20.

In this case, too, the same advantages as the embodiments above can be achieved. Also, because an AGC circuit is omitted, the circuit configuration is simplified, the consumption current is reduced, and the cost is lowered.

In FIG. 10, the drive amplitude is limited by the amplitude limiting circuit 500. However, in a case where the amplitude is maintained almost constant by the non-linearity in the oscillation drive circuit 200, the amplitude limiting circuit 500 can be omitted, too. In this case, the circuit can be further simplified. Alternatively, the amplitude may be limited by limiting the output amplitude of an amplifier 502 that drives the oscillator 100.

Fourth Embodiment

In a case where the gyrosensor (gyroscope) of the invention is used to prevent, for example, shaking of a digital camera, influences of oscillations generated by an image stabilizer or an impact generated by the mirror or the shutter are small. It is therefore possible to prevent camera shaking at a higher degree of accuracy. The performance of an electric device can be thus enhanced.

Figure 12:
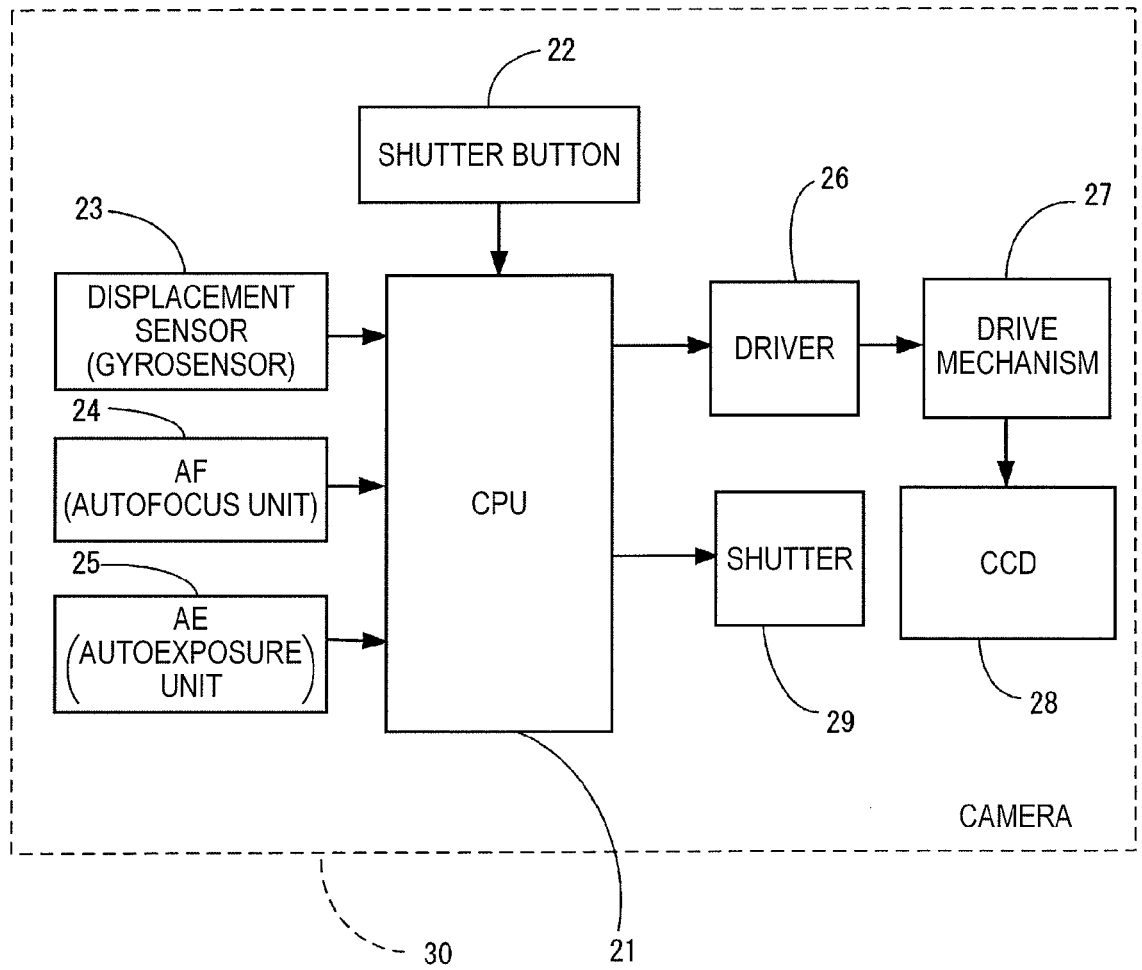
FIG. 12 is a block diagram showing the major configuration of a camera (electronic device) incorporating a gyrosensor.

FIG. 12 is a block diagram showing the major configuration of a camera (electronic device) incorporating the gyrosensor. A camera 30 of FIG. 12 has a CPU 21, a shutter button 22, a gyrosensor 23 serving as a displacement sensor, an AF (Autofocus unit) 24, an AE (Autoexposure unit) 25, a driver 26, a drive mechanism 27, a CCD (imaging portion) 28, and a shutter 29.

The camera 30 is provided with a camera shaking correction portion that corrects blurring in a taken image caused by camera shaking. More specifically, the CCD 28 can be moved independently, for example, in the X direction and the Y direction by the drive mechanism 27. The drive mechanism 27 includes, for example, an actuator, such as a plunger and a piezoelectric element, as the drive source. An amount of movement of the CCD 28 varies with a voltage to be applied to the actuator.

When the shutter button 22 provided to the camera 30 is depressed by the user, the shutter 29 operates and the gyrosensor 23 serving as the displacement sensor starts to operate at the same time. Also, the drive mechanism 27 is driven by the driver 26 concurrently, so that camera shaking is corrected by instantaneously changing the position of the CCD 28.

The camera 30 includes a movable mechanism that operates in synchronization with the gyrosensor 23 (a physical quantity measuring apparatus including the gyrosensor 23) serving as the displacement sensor. The movable mechanism operates concurrently with the gyrosensor 23 (physical quantity measuring apparatus) serving as the displacement sensor. In short, there may be a case where an operation period of the movable mechanism overlaps an operation period of the gyrosensor 23.

Herein, the movable mechanism (movable portion) is a configuration having, for example, a mechanical movable portion or a configuration having a movable portion including a mechanical component whose position is displaceable. Examples of the movable mechanism (movable portion) include but not limited to the shutter 29, the drive mechanism 27 including the actuator and the like, and the CCD 28 configured to be movable.

Hence, in a case where the gyrosensor 23 serving as the displacement sensor operates, it may undergo influences of oscillations and impacts generated by the movable mechanism and the sensitivity may vary in the case of a gyrosensor in the related art. More specifically, the ratiometric configuration in the related art is the configuration with the purpose to maintain the sensitivity of the sensor to the power source voltage constant. It can therefore address a fluctuation of the power supply voltage. However, it cannot maintain the sensitivity of the sensor constant in response to the mechanical oscillations and impacts as described above.

In the case of the gyrosensor 23 of the invention, however, because it adopts the ratiometric configuration with respect to the drive amplitude (amplitude of the drive oscillation) of the oscillator (that is, a novel ratiometric configuration in which the detection sensitivity does not vary even when the amplitude of the drive oscillation varies), it is possible to eliminate influences of oscillations and impacts from the movable mechanism. The imaging capability of the camera (that is, the electronic device) can be thus enhanced.

Fifth Embodiment

In this embodiment, the gyrosensor (gyroscope) of the invention is used to prevent, for example, shaking of a digital single-lens reflex camera.

Figure 13:
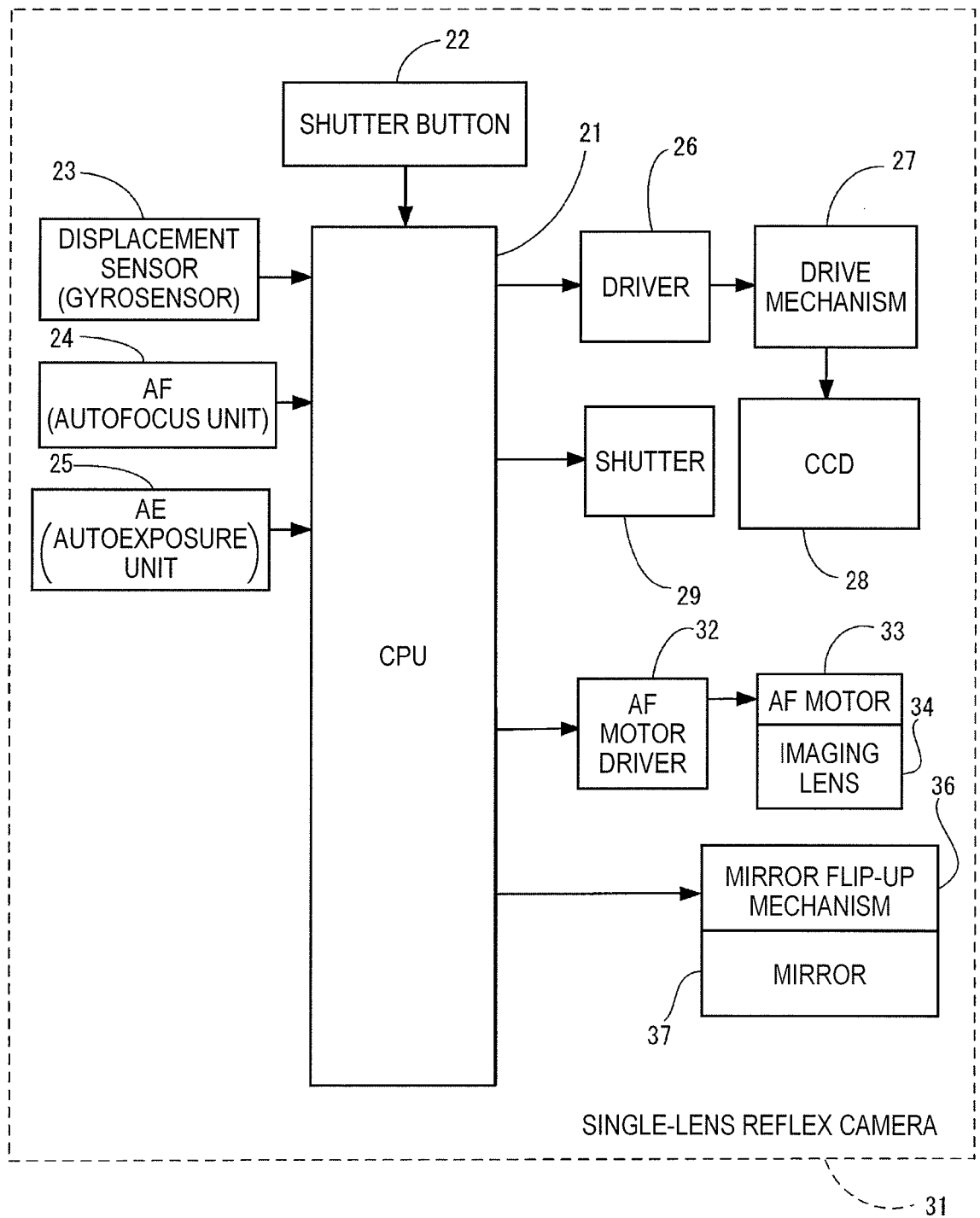
FIG. 13 is a view showing an example of the major configuration of a digital single-lens reflex camera enclosing the gyrosensor (oscillatory gyroscope) of the invention.

FIG. 13 is a view showing an example of the major configuration of a digital single-lens reflex camera enclosing the gyrosensor (oscillatory gyroscope) of the invention. In FIG. 13, portions common with FIG. 12 are labeled with the same reference numerals. A digital single-lens reflex camera 31 of FIG. 13 has an AF (Autofocus) motor driver 32, an AF motor 33, an imaging lens 34, a mirror flip-up mechanism 36, and a mirror 37 in addition to the components shown in FIG. 12. A quick return mechanism may be provided instead of the mirror flip-up mechanism 36. The AF motor driver 32 and the AF motor 33 form an AF control mechanism (AF control portion) that achieves automatic focusing (autofocus control) by adjusting the position of the imaging lens 34.

The mirror flip-up mechanism 36 operates so that the mirror 37 evacuates from the optical axis or returns to the original position instantaneously, and mechanical impacts are generated in association with such an operation. Hence, the mirror flip-up mechanism 36, which is a movable mechanism, can be an impact source. Also, the AF control mechanism provided to the single-lens reflex camera 31 may possibly generate mechanical impacts when the AF motor is driven or stopped driving. Hence, the movable mechanism can be the impact source.

The gyrosensor (gyroscope) 23 of the invention incorporated in the digital single-lens reflex camera 31 is thus able to measure an angular velocity always at a high degree of accuracy without being affected by mechanical impacts generated in association with operations of the movable mechanism, which is the impact source. It is therefore possible to always correct camera shaking precisely.

Sixth Embodiment

In this embodiment, the gyrosensor (gyroscope) of the invention is incorporated, for example, into a home-use game controller (mobile game controller).

Figure 14:
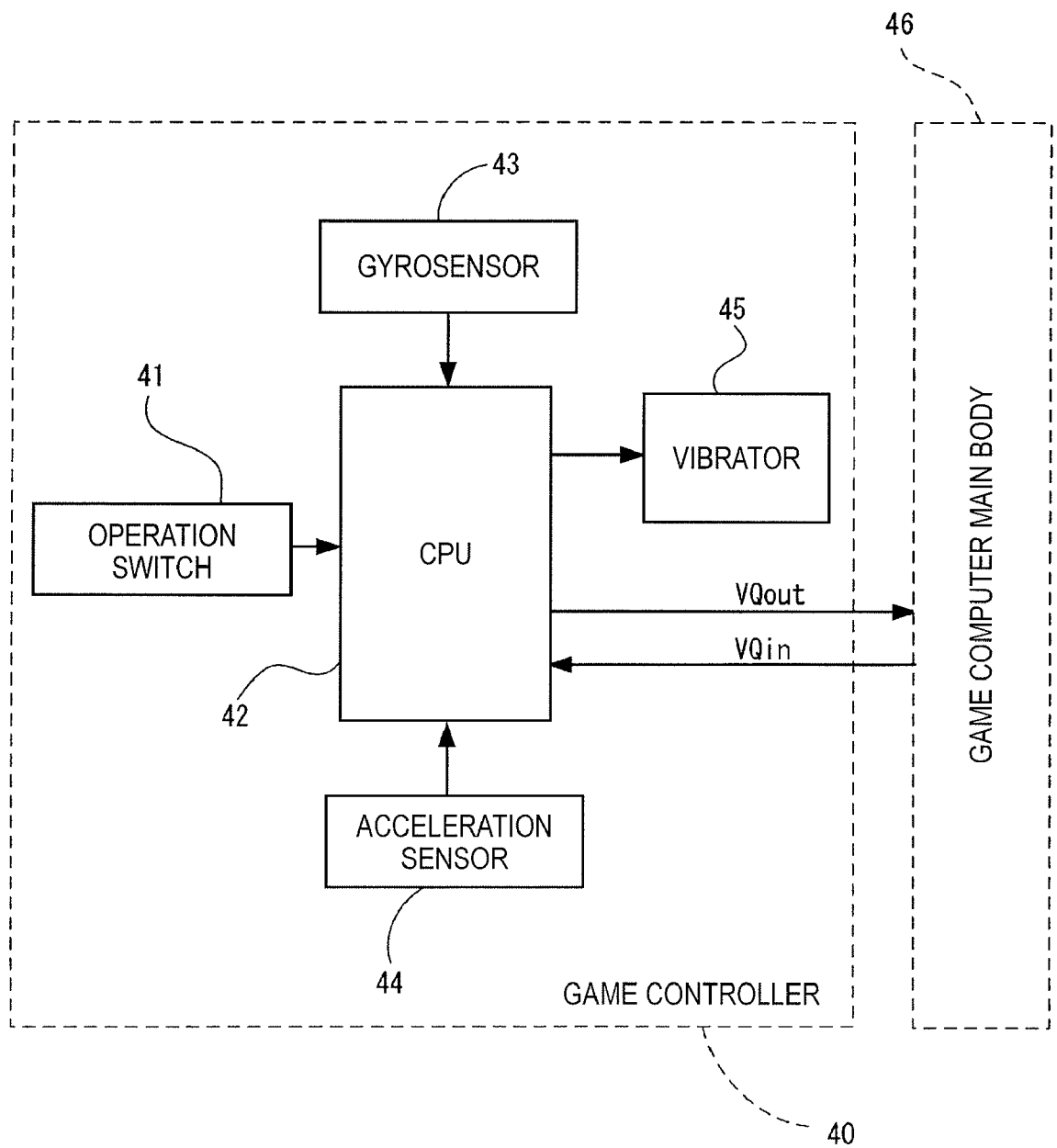
FIG. 14 is a view showing an example of the major configuration of a game controller enclosing the gyrosensor (oscillatory gyroscope) of the invention.

FIG. 14 is a view showing an example of the major configuration of a game controller enclosing the gyrosensor (oscillatory gyroscope) of the invention. A game controller 40 is connected to a game computer main body 46 via cable communications or wireless communications. The game controller 40 has an operation switch 41, a CPU 42, a gyrosensor 43, an acceleration sensor 44, and a vibrator 45 to cause the game controller main body to oscillate. The CPU 42 transmits a control signal (VQout) to keep a game going to the game computer main body 46. Also, a command (VQin) to control an operation of the vibrator 45 is inputted to the CPU 42 from the game computer main body 46.

The vibrator 45 is provided for enabling the user to enjoy a game with a realistic feeling. The vibrator 45 is a mechanical oscillation source. The gyrosensor (gyroscope) 43 of the invention is provided, for example, to detect the posture of the game controller 40. Also, the accelerator 44 is provided to detect an inclination of the game controller 40.

The gyrosensor (gyroscope) 43 of the invention is able to measure an angular velocity always at a high degree of accuracy without being affected by mechanical impacts generated by an operation (oscillation) of the vibrator 45, which is the movable mechanism. The posture can be thus always detected precisely.

As has been described, according to some embodiments of the invention, for example, advantages as follows can be achieved. It should be appreciated, however, that the following advantages are not necessarily achieved at the same time and it should be understood that the advantages detailed below are not used as the ground to unduly limit the technical scope of the invention.

(1) For example, it is possible to maintain the sensitivity to an angular velocity constant without having to maintain the amplitude of the drive oscillation constant in the oscillatory gyroscope.

(2) The amplitude of the drive oscillation is not constant at the start of oscillation even in a case where the gyroscope has a circuit (automatic gain control circuit) that maintains the amplitude of the drive oscillation constant. However, when the invention is applied, influences to the detection sensitivity are minimized even when the amplitude of the drive oscillation is not constant, which makes it possible to form a gyroscope having, for example, more stable sensitivity.

(3) Because the method for allowing the reference of the A/D converter to vary in response to the amplitude of the drive oscillation is adopted as the means for maintaining the detection sensitivity constant, the gyroscope is excellent in the temperature characteristic and the linearity in comparison with the case of using an analog multiplier and a gain control amplifier, which makes it possible to achieve precise control more readily.

(4) Because the detection sensitivity to a physical quantity can be maintained constant independently of a disturbance, it is possible of obtain an effective detection signal of the physical quantity even in the oscillation start period (a period since the power is turned on until an oscillation stationary state is achieved). The waiting time at the start-up can be thus shortened.

(5) The countermeasure against the cause of an electrical disturbance, such as a fluctuation of the power supply voltage and the countermeasure against the cause of a mechanical disturbance (impacts and shaking given to the electronic device), can be achieved. The performance of the electronic device can be thus enhanced.

While the embodiments have been described, it is readily understood by anyone skilled in the art that various modifications are possible from novel matters and advantages of the invention without deviating from the scope of the invention. It is therefore understood that all of such modifications are included in the invention.

For example, a term used together with another comprehensive or synonymous term at least once in the specification or the drawings can be replaced with such another term anywhere in the specification or the drawings. Also, any combination of the embodiments above and modifications thereof is included in the scope of the invention. The structure of the oscillator, and the configurations and operations of the detection device, the drive circuit, the detection circuit, the sensor, and the electronic device are not limited to those described in the embodiments above and various modifications are possible.

The embodiments above described a case where the physical quantity transducer is a piezoelectric oscillator (oscillatory gyroscope: oscillatory gyroscope element) and the sensor is a gyrosensor by way of example. It should be appreciated, however, that the invention is not limited to these examples. The invention is also applicable, for example, to drive and detection circuits in general of the oscillatory gyroscope. The same configuration is available not only in a piezoelectric-driven physical quantity transducer, such as crystal, but also in an electrostatic-driven physical quantity transducer, such as a silicon MEMS (Micro-Electro-Mechanical Systems), and the same advantages can be achieved with any type.

The physical quantity measuring apparatus of the invention can be incorporated, for example, into a video camera, a digital camera, a car navigation system, an aircraft, and a robot. As has been described, because the physical quantity measuring apparatus of the invention is able to maintain the detection sensitivity to a physical quantity constant independently of a disturbance, an effective detection signal of a physical quantity can be obtained even in the oscillation start period (a period since the power is turned on until an oscillation stationary state is achieved). The waiting time at the start-up can be thus shortened.

In addition, not only the countermeasure against the cause of an electrical disturbance, such as a fluctuation of the power supply voltage, but also the countermeasure against the cause of a mechanical disturbance (impact and shaking given to the electronic device) can be achieved. In particular, in a case where the gyrosensor of the invention is used in an electronic device provided with a movable mechanism that operates concurrently with the gyrosensor, it is possible to prevent deterioration in accuracy of the sensor due to influences of the oscillation generated by the movable mechanism. For example, in a case where the gyrosensor of the invention is used to prevent shaking of a digital camera, camera shaking can be prevented at a higher degree of accuracy because influences from oscillations generated by the image stabilizer and impacts generated by the mirror and the shutter are small. The performance of the electronic device can be thus enhanced.

The entire disclosure of Japanese Patent Application Nos. 2008-049286, filed Feb. 29, 2008 and 2008-307619, filed Dec. 2, 2008 are expressly incorporated by reference herein.

What is claimed is:

1. A physical quantity measuring apparatus, comprising:
    an oscillation drive circuit that forms an oscillation loop together with a physical quantity transducer and excites a drive oscillation of the physical quantity transducer; and
    a detection circuit that detects an analog detection signal outputted from the physical quantity transducer using a synchronization detection circuit first and thence converts the signal that has been detected into a digital signal using an A/D converter to output the digital signal, wherein:
    the oscillation drive circuit has a drive amplitude detection circuit that detects an amplitude of the drive oscillation; and
    a voltage level of a reference of the A/D converter included in the detection circuit is controlled on the basis of a detection output signal of the drive amplitude detection circuit.

2. The physical quantity measuring apparatus according to claim 1, wherein:
    the voltage level of the reference of the A/D converter is controlled so that a variance width of the A/D converter is proportional to the amplitude of the drive oscillation.

3. The physical quantity measuring apparatus according to claim 1, wherein:
    the oscillation drive circuit has an AGC circuit to maintain the amplitude of the drive oscillation constant and the drive amplitude detection circuit is one of circuits that form the AGC circuit.

4. The physical quantity measuring apparatus according to claim 1, wherein:
    at least one of the detection output signal of the drive amplitude detection circuit and a signal obtained by inverting a voltage level of the detection output signal is used as the reference of the A/D converter.

5. The physical quantity measuring apparatus according to claim 1, wherein:
    given a signal obtained by adjusting a voltage level of the detection output signal of the drive amplitude detection circuit as a first signal and a signal obtained by inverting a voltage level of the first signal as a second signal, then at least one of the first signal and the second signal is used as the reference of the A/D converter.

6. The physical quantity measuring apparatus according to claim 4, wherein:
    the detection circuit has an offset adjusting circuit that compensates for an offset voltage superimposed on the detection output signal of the drive amplitude detection circuit.

7. The physical quantity measuring apparatus according to claim 1, wherein the drive amplitude detection circuit has:
    a rectifying circuit that rectifies an oscillation signal of the oscillation loop; and
    a smoothing circuit that smoothes out an output signal of the rectifying circuit.

8. The physical quantity measuring apparatus according to claim 1, wherein:
    the drive amplitude detection circuit is formed of a rectifying and integrating circuit formed by integrating a rectifying circuit that rectifies an oscillation signal of the oscillation loop and an integrating circuit that integrates a rectified signal into one piece.

9. The physical quantity measuring apparatus according to claim 1, wherein:
    the oscillation drive circuit has an amplitude limiting circuit that is provided instead of an AGC circuit to maintain the amplitude of the drive oscillation constant in order to limit at least one of an upper limit and a lower limit of the amplitude of the drive oscillation.

10. An electronic device, comprising:
    the physical quantity measuring apparatus set forth in claim 1; and
    a movable mechanism that operates concurrently with the physical quantity measuring apparatus.

11. The physical quantity measuring apparatus according to claim 1, wherein:
    the physical quantity measuring apparatus is a gyrosensor; and
    the physical quantity transducer is an oscillatory gyroscope element in which the drive oscillation is excited by the oscillation drive circuit and that generates a detection signal having amplitude corresponding to an angular velocity.

12. An electronic device, comprising:
    the physical quantity measuring apparatus set forth in claim 1; and
    a movable mechanism,
    wherein an operation period of the physical quantity measuring apparatus overlaps an operation period of the movable mechanism.

13. The electronic device according to claim 12, wherein:
    the movable mechanism includes a mechanical movable component.

14. The electronic device according to claim 12, wherein:
    the movable mechanism is an impact source that generates an impact.

15. The electronic device according to claim 12, wherein:
    the movable mechanism is an oscillation source that generates an oscillation.

* * * * *